United States Patent [19]
Dubois

[11] 3,728,623
[45] Apr. 17, 1973

[54] METHOD AND APPARATUS FOR SPECTROGRAM DISPLAY CONTROL

[75] Inventor: Carl E. Dubois, San Diego, Calif.

[73] Assignee: Spectral Dynamics Corporation of San Diego, San Diego, Calif.

[22] Filed: Mar. 15, 1972

[21] Appl. No.: 234,964

[52] U.S. Cl. .................................................. 324/77 B
[51] Int. Cl. ......................... G01r 23/16, G01r 27/02
[58] Field of Search ................. 324/77 A, 77 B, 77 C, 324/77 CS, 77 G, 78 F, 78 J

[56] References Cited

UNITED STATES PATENTS

| | | | |
|---|---|---|---|
| 3,566,035 | 2/1971 | Noll et al. | 324/77 B |
| 3,621,388 | 11/1971 | Davis | 324/77 B |
| 3,634,688 | 1/1972 | DiRocco | 324/77 A |

*Primary Examiner*—Stanley T. Krawczewicz
*Attorney*—Carl R. Brown et al.

[57] ABSTRACT

A spectrogram display control unit that provides control of the displaying of frequency spectrum data in a composite X-Y display having multiple spectra data displayed in line by line arrangement, with the line spectra data being updated and refreshed serially. The spectra data is restored in a circulating memory shift register that receives updated information in timed sequence from another memory unit, which other memory unit provides time-controlled, interrogation of frequency data. The other memory unit can also average spectra data stored therein and supplied to the circulating memory unit at selected time intervals, that prevents loss of data between updating times.

16 Claims, 3 Drawing Figures

3,728,623

METHOD AND APPARATUS FOR SPECTROGRAM DISPLAY CONTROL

BACKGROUND OF THE INVENTION

In spectrum analysis of complex data signals, it is desirable to analyze the amplitude of particular frequencies of interest in the complex signals. Where the input data signal is a repetitive signal, then there are various techniques for analyzing the input data, such as by heterodyning techniques. An example of such a heterodyning analyzer is illustrated in U. S. Pat. No. 3,621,388. Known wave analyzers may provide output data information in any of several forms. So there are octave band analyzers, fractional octave analyzers, constant percentage bandwidth analyzers, distortion analyzers and constant band analyzers, the latter of which is usually of the heterodyne type. These analyzers can analyze a single frequency and also given bandwidths of an input signal that covers a wide frequency band. Thus they select and analyze selected bandwidths of frequencies from the input complex waveform or data signals and are capable of providing spectrum analysis of reoccurring signals. This information is used in many applications, such as in vibration analysis, acoustic analysis and the like.

The output of the wave analyzers or spectrum analysis analyzers, generally known as spectrum analysis data can be recorded or displayed in known display devices. However the display devices normally provide instantaneous spectrum analysis displays that do not provide historical information desirable to detect the changes in spectrum data of reoccurring complex data signals.

Thus it is advantageous to have a spectrogram display control unit that formats the spectrum data output from a wave analyzer into a composite spectrogram display with spectra lines presented in an X-Y format, which spectra lines are refreshed at a given rate with new spectrum data.

SUMMARY OF THE INVENTION

In an embodiment of the method and apparatus of this invention, an electronic wave analyzer analyzes complex data signals for amplitudes of particular frequencies of interest. By heterodyning the input data signal with a tuning signal that is varied at a prescribed rate in a series of prescribed frequency steps, a frequency interrogation of the input data signal is accomplished over a prescribed number of frequency steps. The output of the heterodyne circuit is passed through a bandpass filter, in the manner described in U. S. Pat. No. 3,621,388, where the amplitude is detected relative to the frequency tuning providing spectrum data outputs. A recirculating memory in the input of the electronic wave analyzer circuit, recirculates the input complex data signals so that these signals are analyzed in the step frequencies of the local oscillator. A clock signal for the electronic wave analyzer, provides the synchronizing signals for the local oscillator as well as the synchronizing signals for the recirculating memory. Thus the detector output provides spectrum data in analog form in serial time intervals for spectrogram display of frequencies of interest in the input data signal. The clock circuit in the electronic wave analyzer also provides sweep trigger signal outputs and memory sync signal outputs for driving control circuit portions of the spectrogram display control unit.

The spectrogram display unit converts the spectrum output data into binary spectra information through an A to D converter. This spectra information then comprises a series of binary digital words for the step frequency display and analysis of the input data signal. This spectra information is fed to a memory unit or binary shift register, that stores the information at a frequency rate set by a control circuit. This control circuit also sets the interrogation times of the spectrum data output that is fed into the shift register of the first memory unit. The spectra data in the first memory system is then, at controlled times, fed to a second memory unit or shift register that recirculates a given number of spectra data therein, such as for example, 64 spectra data. Clock means are provided for shifting the 64 spectra data in the memory shift register at a given rate that allows interrogation of the 64 spectra data. The interrogation information is fed to a display device that displays the spectra data in line form in an X-Y display spectrogram. The shifting means employs the clock signal to synchronize the X-Y display with the circulation of the spectra data in the second memory means. Thus the spectra data is displayed in a set format in the X-Y display in line form. The shifting means and a control circuit also use the synchronizing signal and the sweep trigger signal and the memory sync signal for shifting the spectra data from the first memory to the second memory in synchronized coordination with the recirculation of the spectra data in the second memory unit. So the updating spectra data from the first memory unit is inserted at a given time sequence in the recirculation of the spectra data in the second memory unit, causing a first-in, first-out updating of data in the second memory unit that provides through the X-Y display, a line by line updating of the spectrum data displayed. Since the spectrum output data is only sampled at given intervals of time, it is advantageous to sum the spectrum data between time intervals of interrogation of the data by the second memory unit, to prevent loss of data between output update times in refreshing the spectra in the second memory unit. Thus recirculation and summing of new spectra data in the first memory unit is accomplished by adding the data in the memory unit and dividing the data in the transfer to the second shift register, providing an averaging of the spectrum output data over a plurality of spectra data.

The spectrogram format may comprise, for example, 64 spectra lines having 500 frequency data points in each line, that is presented in the X-Y display at a refresh rate of 62+ hertz. The spectrogram may be updated at given time intervals, such as for example, between 0.1 second to 12 seconds in various selectable update rates that are set by a control range memory update device. Where the X-Y display is a cathode ray tube and when the display lines of spectra are displayed at long enough time intervals, the lines move down the X-Y display giving a water-fall type effect. The update spectra line may be added either to the top or bottom of the spectrogram or X-Y display and the lines may either move up or down. Since the spectrum data is received from the electronic wave analyzer in analog form and is converted to binary form for processing through the first and second memory devices that may be shift registers or the like, and is then changed into analog for display in the X-Y display unit, the clock signal or synchronizing signal for the shifting means provides snychronization of the internal operation of A to D conversion and averaging in the first memory unit, and also generates signals for external sweep signals to the display unit as well as the shifting of the spectra data out of the second memory unit. So there is provided an X-Y format of line by line spectrum data that displays frequencies of interest relative to their magnitudes, that are displayed in a calibrated X-Y display with the display being updated at given time rates to provide a history of the data for analysis of reoccurring signals. Further the display is provided at display speeds that exceed that possible by frequency by frequency analysis of an input data signal.

It is therefore an object of this invention to provide a new and improved method and spectrogram display control unit for displaying frequency spectrum data produced by a frequency spectrum analyzer or electronic wave analyzer.

These and other objects and features of this invention will become more apparent upon a reading of the following detailed description and an analysis of the drawings wherein like reference characters designate like parts throughout and in which.

Figure 1:
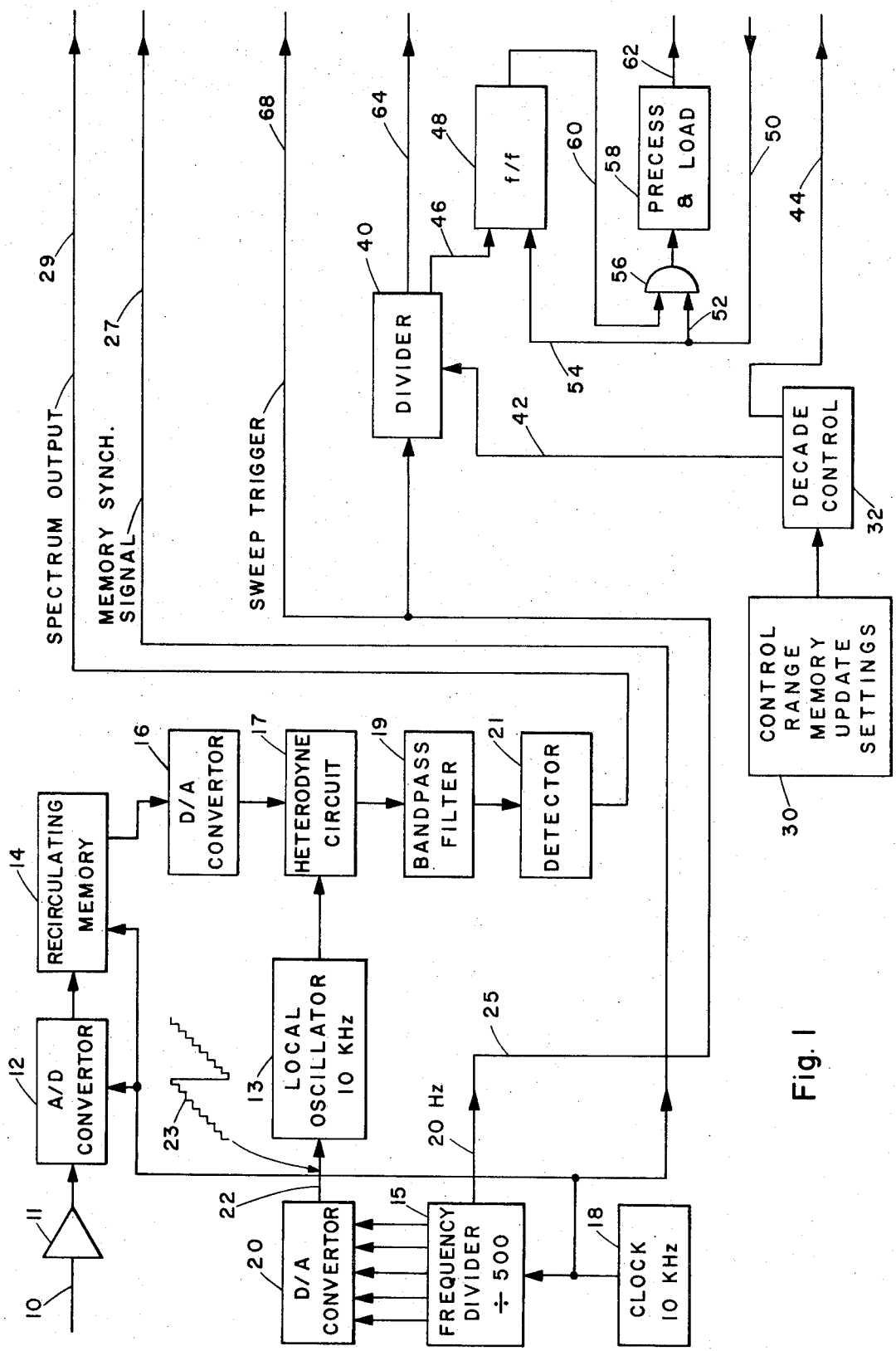
FIG. 1 and FIG. 2 are a block diagram of an embodiment of the spectrogram display control unit.

Referring to FIG. 1, a complex data signal is fed to line 10 from any suitable signal input source. This input signal is normally from a reoccurring source that has changes in amplitudes at various frequencies in the signal, such as a continuous signal from a microphone, accelerometer, or the like. Such signal information may be vibration test signal information, acoustic analysis signal information, or any other suitable input frequency signal information, of which it is desired to know the magnitude of individual frequency components. This input signal is fed through amplifier 11 to an analog to digital converter 12. The A to D converter 12 converts the analog input signal to a digital signal at a given clock frequency. For purposes of explanation of this embodiment, the basic clock frequency is 10 K Hz and is supplied by clock 18. The digital signal is fed to the recirculating memory 14 that recirculates the input frequency signal in a compressed time sequence in digital form, at a 10 K Hz recirculating speed. Thus the input frequency signal is compressed to a time recirculation of 100 microseconds. This output signal is then fed to D to A converter 16 and the output analog signal is then fed to the heterodyne circuit 17, where it is beat with a local oscillator signal received from local oscillator 13.

The clock signal source 18 feeds a 10 K Hz signal output to a frequency divider and counter 15. Frequency divider 15 in this illustrative embodiment divides the 10 K Hz clock signal by 500, providing a series of output pulses to the D to A converter 20 having a frequency of 20 Hz and an increasing digital number. The D to A converter converts this digital signal to an increasing analog signal that drives the local oscillator 13 to successive step increases in frequency, proportional to the increase in voltage of the output signals of the D to A converter 20 in line 22. Thus the local oscillator provides a plurality, in this embodiment 500, step increases in frequency with each frequency step having a time interval of 100 microseconds. At the end of each set of 500 output steps, the D to A converter 20 recycles dropping the input voltage to the local oscillator 13. This provides an output from of a group of 500 step frequencies for each time that the recirculating memory 14 recirculates the input signal to the D to A converter 16 and the heterodyne circuit 17. The recirculating memory 14 provides the full input signal sample to the heterodyne circuit 17 each 100 microseconds, which is heterodyned with each step of the local oscillator signal. So each signal sample of the input signal in the memory 14 is interrogated over 500 step frequencies. Bandpass filter 19 filters the output signal of the heterodyne circuit and detector 21 detects the amplitude of the signal providing an analog output that is the spectrum output.

Figure 2:
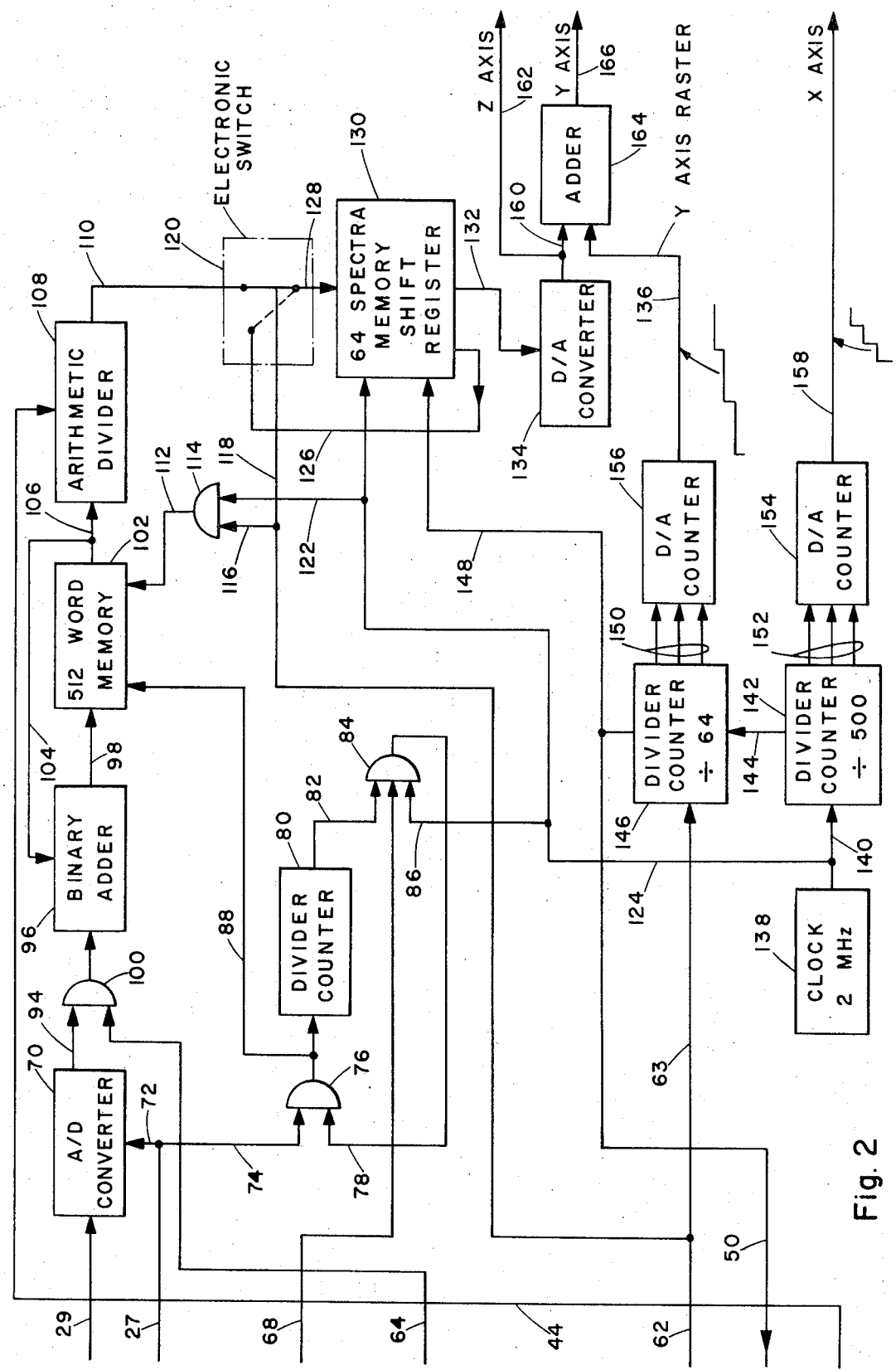
Figure 3:
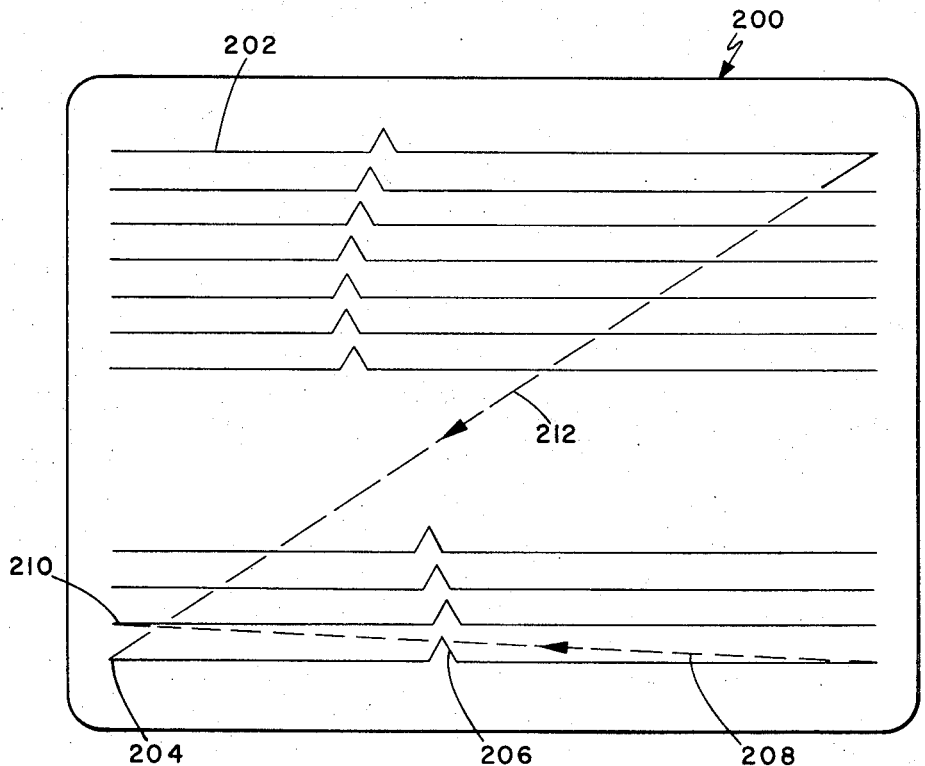
FIG. 3 is an illustration of an X-Y spectrogram display on the screen of a cathode ray tube.

Clock 138, see FIG. 2, supplies a 2 M Hz signal that provides the clocking or timing, synchronizing signals for the shift register 130 and also provides the clock signal for the display of the linear step spectrum data on a display cathode ray tube 200, see FIG. 3. The clock signal provided by clock 138 may be of any desired frequency that will provide a non-flicker display on the cathode ray tube display. This clock signal is independent of the clock signal output of clock 18. The 2 M Hz signal is fed through line 140 and through divider 142 and lines 152 to D to A converter 154 that provides the X axis control signals for the display cathode ray tube. Divider 142 divides the input signal by 500, providing a 4 K Hz sweep synchronized signal having 500 increasing step binary levels. Thus the divider counter 142 provides an output signal in timed sequence at each binary division providing 500 separate in time output signals that are serially 500 counts in binary digital form in timed sequence. The D to A converter in response thereto supplies an analog ramp signal with analog step increases having 500 steps. This provides a line display, as for example line 204. A well known, sequencing, flip-flop stage, divider counter can be employed as the binary divider counter 142.

The divider counter 142 also supplies a divided signal pulse through line 144 to divider counter 146. Divider counter 146 divides by 64. Thus the 4 K Hz signal output of divider 142 is divided by 64 into 64 sequenced output counts in binary digital form through lines 150 to the D to A converter 156. The output of D to A converter 156 is supplied through line 136 in 64 analog increasing step signals to adder 164. This provides the Y axis raster signal for 64 lines of display on the cathode ray display tube 200, with each line having a time sequence that equal to one 500 step movement of the X axis signal or 250 microseconds. The D to A output signal in line 136 increases in steps to reposition the Y axis for each X axis sweep of the electronic beam. This moves the display from the bottom to the top of the display tube. The complement of this signal can also be supplied, thereby moving the display from the top to the bottom.

The divider counter 146 also supplies a synchronizing signal through line 148 to the memory shift register 130 that times the recirculation of the input data in memory 130 to that of the X axis raster. This supplies 64 spectra signals through lines 132 and D to A converter 134 to provide a line spectra of information for each Y axis deflection of the electron beam by the Y axis raster signal, that is superimposed upon the Y axis raster signal in line 136 by adder 164. This provides the Y axis deflection signal to the cathode ray tube display 200 through line 166 and provides the raised blip indication 206 displaying a frequency of interest that has a magnitude to be displayed. The output of D to A converter 134 also is fed through line 162 to control the electron beam intensity of the display tube. This increases the intensity of the blip display. The divider counter 146 while synchronizing the spectra information to the display, is precessed by the signal from line 62 to cause the line data to move on the X-Y display in response to the updating of the spectra in memory 130.

The 64 spectra memory shift register 130 is a recirculating memory shift register that has a capacity for continuously presenting 64 spectra of 500 bit words that reflect the spectrum output data of line 29. The four spectrum output data is fed through line 29 to A to D converter 70 where the analog information is converted to binary information. This data information is then fed through line 94, binary adder 96, line 98, AND gate 100 into the 512 word memory storage register 102. In a manner that will be described in more detail hereinafter, the memory unit 102 stores each input spectrum data in 500 plus 12 words, that is then upon call fed through line 106, arithmetic divider 108, line 110, electronic switch 120 and line 128 to the memory shift register 130. The memory shift register 130 accepts this data in timed sequence at a normal refresh rate for this embodiment of 62 + Hz in a manner that will be described in more detail hereinafter, that continuously updates the information in the recirculating memory shift register 130. The output of the memory shift register 130 is fed through line 132 to the D to A converter 134. The D to A converter 134 converts the binary information to analog information that is fed to the Z axis and Y axis of the cathode ray display tube 200. The output of the memory shift register 130 is also fed through line 126 and through electronic switch 120 and line 128 back into the input of the shift register 130 for the recirculating memory shift register operation.

The output of the memory shift register 130 is timed to provide the spectrum output data in correct synchronism with the X axis step shift and the Y axis raster signals to the cathode ray display 200. A sync pulse is supplied through line 148 from divider 146 to the memory shift register 130 at the start of each raster signal in line 136. Thus the pulse is fed when the divider 146 feeds a new sequence of pulses to the D to A converter 156. This shifts the data out of the memory shift register 130 at a 2 M Hz rate that is synchronized by the clock signals received through line 124 from clock 138. The memory shift data is actually 500 binary words rather than 512 words, as will be described in more detail hereinafter. Thus 500 binary words of information representing 500 frequency steps in the spectrum output data are provided for each of the Y axis raster displays. Each line of this data is called a spectra. So there are 64 spectra stored in the memory shift register 130 providing 64 lines of display in the X-Y display on the cathode ray display 200, and each of the lined spectra data has 500 binary words of information representing the spectrum output data. The extra 12 words provides a time interval for resetting or positioning the electron beam as in dotted lines 208 and 212, see FIG. 3.

The 64 spectra in the memory shift register 130 is updated on a spectra line by spectra line basis with each spectra being individually received from the 512 word memory 102. The individual spectra is shifted to the memory shift register 130 by the shift out, 2 M Hz clock signals received through line 112 from clock 138. The spectrum data is thus fed a line at a time into the memory shift register 130. This is sequenced so that the data is added to the 64 spectra in the memory at the end of each 64 spectra recirculating output, or at the beginning of each 64 spectra output as controlled by the sync signal through line 148. During the loading of memory 130, counter 146 is caused to precess one spectra by the signal in line 62. Therefore the sync signal in line 148 is caused to be displayed for the time of 250 microseconds or one spectra, as in the Y axis raster. Thus when the electronic switch 120 is closed, the new spectra is loaded into memory 130, the oldest spectra is lost, and all spectra in memory 130 is displayed in the X-Y display by being displaced one spectra line. Thus the information in the memory shift register 130 is refreshed at approximately a 62 + Hz rate.

The shifting of the input spectrum information into the 512 word memory 102 is controlled by frequency dividing circuits that are controlled by the control range memory update settings 30. The shift input signal in line 92 is controlled as follows. The A to D converter 70 receives a 10 K Hz memory sync signal from lines 27 and 72. Line 74 also supplies this 10 K Hz signal to the OR gate 76. Since there are no output signals in line 78, this 10 K Hz signal moves through OR gate 76 and through line 88, gate 90 and line 92 to shift the input data information into the 512 word memory 102 at the 10 K Hz rate. It will be noted that the memory 102 has 512 words, however the input information of the spectrum data only has 500 words as determined by the 500 step output at the 10 K Hz rate of the local oscillator 13. So the extra 12 word portion of the 512 word memory 102 must be counted out to place the 500 word spectra data into the output end of the memory 102. This is accomplished by the divider counter 80 and AND gate 84. The 10 K Hz signal that passes through OR gate 76 is fed to the divider counter 80 that has a 512 word capacity. Counter 80 provides an output level while it is in a counting condition through line 82 to AND gate 84. In addition the 2 M Hz clock signal from clock 138 is fed through line 124 and 86 to AND gate 84. The divider counter 80 counts through the 10 K Hz input signal to 500 counts in the 0.05 second. Thus in the time sequence, the 20 Hz sweep trigger signal that passes through line 25 and line 68 to gate 84, opens gate 84 every 0.05 second. Upon the coincidence of the input signals through lines 82, 68, and 86, AND gate 84 feeds the 2 M Hz clock signal through line 78 and OR gate 76 to divider counter 80 and memory 102. Since the 10 K Hz input signal is in pulse form, the 2 M Hz signal passes between the 10 K Hz pulses through OR gate 76. These 2 M Hz pulses immediately count out the remaining 12 counts in divider counter 80, which closes gate 84. Also the 2 M Hz pulses shifts the 512 word memory 102 to the full 512 words. Since the same signal that is counted by counter 80 also shifts memory 102 through line 88, the counter circuit 80 is synchronized in operation with the shifting of information in the 512 word memory 102.

The control range memory update settings 30 controls the ranges or times that the memory shift register 130 is updated. For example, the control range memory update device 30 may set the memory to be updated every 0.1 second, 0.25 second, 1.5 second, 12 seconds, or the like. This is accomplished by setting the control 32 to given settings that have in general decade controls. However any suitable control circuit may be employed. The decade control 32 sets the particular division of divider 34 and divider 40 and the arithmetic divider 108 through line 44. These circuits control the timing of the updating of the spectrum data information in the memory shift register 130 and the refreshing of the information in the word memory 102 and also the recycling rate of the recycling of the spectra for summing purposes, and also the division factor in the arithmetic divider 108.

For illustration purposes for illustrating this specific embodiment, the divider 40 is set to divide the input memory sync signal of 20 Hz by 10. It is intended by this to provide a ½ second memory update of the input data information. Accordingly, divider 40 supplies a 1 Hz signal through line 64 to control the gating of gate 100, for gating the input spectrum data in binary form to the recirculating memory made up of the memory 102 and recirculating path through adder 96. This signal thus controls the entry of data into the word memory 102.

The shifting out of the spectrum data or a single spectra from the memory 102 to the memory shift register 130 to refresh a spectra of data in the memory shift register 130 is controlled by the control range memory update settings 30. The 2 Hz signal pulses are fed from divider 40 through line 46 to the flip flop circuit 48. Each of these input pulses sets the flip flop circuit to provide a level through line 60 to AND gate 56. This conditions the control circuit for receiving a pulse through line 50 from divider 146. This output pulse from divider 146 provides a signal gating AND gate 56 that supplies a pulse to the precess and load circuit 58 that sends out an output signal having a timed duration of 250 microseconds. This signal is fed through line 62 and line 63 to precess divider counter 146 as previously described and line 118 to close the electronic switch 120 connecting line 110 to line 128 for the 250 microsecond time interval. This signal pulse also closes gate 114 through line 116, feeding 2 M Hz signals from clock 138 to the memory 102 shifting out the spectra data. The sync signal in line 50 also passes through line 54 to reset the flip flop circuit 148 so that no signal can be supplied by the precess and load circuit 58 until another half second pulse is received by the flip flop circuit from divider 40.

Since the output control signal from the precess and load circuit 58 is synchronized to the output signal of divider 146 which signal is also fed to the memory shift register 130, switch 120 is always closed at the time that the memory shift register starts to recycle its data at the start of the shift register memory. Accordingly the input information is always fed into the input of the memory shift register in synchronization with the start of its recycling. Since the control circuit signal in line 62 is a 250 microsecond signal, this allows 500 pulses of the 2 M Hz signal to shift the information in memory 102 through line 106, arithematic divider 108 and line 110 and through closed switch 120 and line 128 to the memory shift register 130. It may thus be understood that the spectrum data is fed into the memory 102 at a 10 K Hz rate and is shifted out at 2 M Hz rate. This 2 M Hz rate is in synchronism with the recycling speed of the memory shift register 130. This circuit further synchronizes the input data into the input of the memory shift register 130 at the increased speed, which is separate from the individual settings of the times of updating the information in memory shift register 130 from the controls 30 and 32.

These circuits can either sample input information at different time intervals or add the input signal information and take the average thereof and display this data. If the summing approach is used, then the control circuits 30 and 32 set the particular number of input data signals that are summed. For example, if a summing recirculation of four is desired, then the decade control 32 sets divider 108 to arithmetically divide the output of the word memory 102 by four. Additionally the division factors of divider 40 are 1, 5 and 15. The output pulse of the divider 40 has a 50 millisecond time duration, which gates AND gate 100 for 50 milliseconds, at a 10 Hz rate. Thus input data is capable of being inserted into the memory 102, 10 times a second. Divider 40 also provides an output signal in line 46 of 2 Hz or twice a second. Memory 102 recirculates data through line 104 and binary adder 96 back into memory 102. This occurs four times for each time gate 100 is gated. Since a pulse is provided through line 60 to provide an output signal from the precess and load circuit 58 to open the electronic switch 120 at each half second, the information from the memory 102 is fed through the arithmetic divider 108 to the memory shift register 130. In this embodiment, the arithmetic divider is set by decade control 32 through line 44 to divide by four. Thus four input spectra are fed in and added in memory 102 and then are divided by four before being inserted as update data into the memory shift register 130. When it is desired to take the information into the word memory in the normal manner, that is without summing, then gate 100 is only gated for that time interval that allows one spectra to pass through to the word memory 102 and divider 108 is set to divide by 1.

In operation, a complex signal is fed through line 10 into the A to D converter 12 where it is changed to binary information that is shifted into the shift register or recirculating memory 14. The circulating memory 14 accepts the information at the clock speed and shifts this information out to the D to A converter which converts the information to an analog signal that is heterodyned in the heterodyne circuit 17. Clock 18 supplies a signal to a frequency divider counter 15 that through D to A converter 20 controls the output of the local oscillator 13. The local oscillator 13 provides an output signal having 500 step frequencies that are heterodyned with the data signal. This data signal is then passed through bandpass filter 19 and detector 20 that detects the magnitude of a particular frequency in the input complex signal fed to line 10, as determined by the frequency output of the local oscillator 13. This data information signal is fed through line 29 to A to D converter 70. The input circuit also provides a sweep trigger circuit of, for example, 20 hertz in line 25 and a memory sync signal of 10 K Hz in line 27. The sweep trigger signal is fed through a control circuit where it is divided into frequency control signals that operate to control the gating of gate 100. The memory sync signal comprises a sync signal to the A to D converter 70 and also provides the shift input signal through line 90 to the memory 102. Thus memory 102 is capable of storing a 500 word data input or one spectra of data information. The divider counter 80 and gate 84 provide a means for inserting the 2 M Hz signal of clock 138 into the memory of the shift register 102, to finish out the 512 word memory and load the input information on the discharge end of the shift register.

The control circuit as set by the control range memory update settings 30, provides a synchronized process and load signal to electronic switch 120 that opens the memory shift register 130 for the insertion of a new spectra of data. Simultaneously this control signal gates, gate 114 that applies a 2 M Hz signal from the clock 138 that shifts out the data from the word memory 102 at a 2 M Hz rate, which is the synchronizing signal for the shift register of the memory 130. The clock signal 138 through dividers 142 and 146 provides the X axis signals for the CRT display 200 and also provides an increasing Y axis raster scan signal to the Y axis control of the CRT display. The output of the divider 146 controls the updating of the 64 spectra in the memory shift register, with the Y axis raster scan signal. Accordingly the memory shift register 130 refreshes at a 62 + Hz refresh rate, which shifts out the information for display in a series of line signals in the X direction that are displaced along the Y axis, see FIG. 3. The new spectra data is also synchronized to the precession of the divider counter 146, whose precession may be initiated at the end of a refresh cycle by a signal from control circuit 30. This same signal is routed to switch 28 and gate 114 to feed the 2 M Hz signal to memory 102 that shifts the spectra into the shift register at the start of each recycling of the memory shift register 130.

The display of the spectra information in the display 200, for example lines 204, move in a series of lined patterns in the upward direction, exemplified by lines 210 and 202. Now the spectra information is continuously updated with the new data being fed in at line 202 and successively progressing such as through line 210 down to line 204 where the information is then cycled out of the memory shift register 130. The frequencies having magnitudes of interest, such as indicated at 206 in the display 200, are continuously updated and identified and displayed in a moving display with time intervals of selection as determined by the control circuits 30 and 32.

Also a plurality of input spectrum data may be recycled in memory 102 through binary adder 96 to cause an adding of a plurality of spectra data that when divided by the arithmetic divider 108 provides a spectra inserted into the memory shift register 130 that is a summation of a plurality of spectra signals.

Thus a data display of the input frequencies of interest are displayed in a continuously updated display, that also provides a history of prior frequency signal information that was detected and displayed. This provides a very valuable tool in the analysis of the frequencies of interest in complex input data signals. Further these signals are provided at a very rapid display rate that has a considerable higher speed than the frequency rate of the input signal.

Having described my invention, I now claim.

1. A spectrogram display control for displaying frequency spectrum data produced by a wave analyzer comprising,
    first memory means for receiving and serially storing spectra data of the frequency spectrum data,
    second memory means for storing a series of spectra data received from said first memory means and recirculating the spectra data in said second memory means,
    means for shifting the spectra data from said first memory means to said second memory means updating the spectra data in said second memory means,
    and means for transferring the spectra data information in said second memory means to a composite display.

2. In a spectrogram display control as claimed in claim 1 including,
    synchronizing means for synchronizing said shift means to shift the spectra data from said first memory means to said second memory means in synchronism with a given time sequence in the recirculating of the spectra data in said second memory means,
    and the spectra data being shifted out of said second memory means on a first-in, first-out basis and the spectra data received from said first memory means replacing the shifted out spectra data, updating a constant number of spectra data circulating in said second memory means.

3. In a spectrogram display control as claimed in claim 2 in which,
    said synchronizing means having means for providing clock signals that synchronize the recirculation of said second memory means,
    and said transfer means being responsive to said clock signals for displaying the recirculating spectra data in a given X-Y display format.

4. In a spectrogram display control as claimed in claim 3 including,
    control circuit means responsive to said clock signals for providing an output control signal to said synchronizing means that synchronizes the updating spectra data shifted from said first memory means to said second memory means to be a new line in the X-Y display having the same initial location at each updating time interval.

5. In a spectrogram display control as claimed in claim 4 in which,
    said synchronizing means including X axis means for providing X axis displacement signals to an X-Y display,
    Y axis means for providing Y axis displacement signals and Z axis means for providing intensity modulation to the X-Y display,
    and said X axis means and said Y axis means being responsive to said clock signals for providing an X-

Y display control that is directly coordinated with the recirculation of the spectra data in said second memory means, whereby said spectra data is displayed in the X-Y display format in a line by line display having the updated information in the first line, which progresses to the last line, and is then removed from the display as the spectra data is removed from the second memory means.

6. In a spectrogram display control as claimed in claim 5 in which,
said Z axis information being provided by the spectra data information circulating in said second memory means.

7. In a spectrogram display control as claimed in claim 3 in which,
the X-Y display comprises a cathode ray tube display,
said synchronizing means having X axis means for providing X axis step control signals and Y axis means for providing Y axis raster step control signals and Z axis means for providing data signals for intensity modulating the electron beam,
said X axis means and Y axis means being controlled by said clock signals whereby the X axis control signals have a given number of steps for each step in the Y axis raster control signals,
said second memory means recirculates said spectra data in synchronism with each step of the Y axis raster signals,
and the Z axis data signals being responsive to the spectra data to vary the intensity of said electron beam in synchronism with each step of the X axis control signal.

8. In a spectrogram display control as claimed in claim 1 including,
control circuit means for providing selective time control signals,
and gate means responsive to the time control signals for feeding refreshing spectra data to said first memory means at time rates varying from the time rate of spectra data provided by the wave analyzer.

9. In a spectrogram display control as claimed in claim 8 including,
second control circuit means responsive to said control circuit means for recirculating spectra data in said first memory means at a rate that may vary from the rate of gating spectra data into said first memory means by said gate means.

10. In a spectrogram display control as claimed in claim 9 including,
adder means for receiving the spectra data and feeding the spectra data from said gate means to said first memory means,
divider means for passing the spectra data from said first memory means to said second memory means,
said first and second control means providing for recirculating data in said first memory means that adds with succeeding spectra data received through said gate means,
and said divider means being set by said control means to divide the spectra data output of said first memory means providing an average of a given number of spectra data which spectra data average is shifted into said second memory means.

11. The method of displaying frequency spectrum data produced by a wave analyzer in X-Y updated display form comprising the steps of,
storing a spectra of frequency spectrum data in a first memory unit,
shifting the spectra data from said first memory unit to second memory unit,
storing a given number of spectra data in said second memory unit,
recirculating said spectra data in said second memory unit,
transferring said spectra data information to a composite display,
and coordinating the shifting of the spectra data from said first memory unit to said second memory unit to update the recirculating spectra data in said second memory unit with one at a time received spectra data.

12. The method of displaying frequency spectrum data as claimed in claim 11 including the step of,
synchronizing the transferring of the spectra data information to a composite display with the coordinated shifting of the spectra data from the first memory unit to the second memory unit to display the updated information in the composite display at a given initial point of the display in each occurrance thereof.

13. The method of displaying frequency spectrum data as claimed in claim 11 including the steps of,
feeding the frequency spectrum data to the first memory unit at a rate of one spectra at a time,
at selective intervals adding one spectra data to succeeding spectra data in said first memory unit,
and dividing the summed spectra data by the number of spectra data added and transferring the averaged spectra data from the first memory unit to the second memory unit.

14. The method of displaying frequency spectrum data as claimed in claim 11 including the steps of,
feeding the spectra data to the first memory unit at a rate different from the spectra data produced by the wave analyzer.

15. The method of displaying frequency spectrum data as claimed in claim 11 where the X-Y display is a cathode ray tube including the steps of,
providing X axis signals in step voltage form and Y axis raster signals in step voltage form to provide the X-Y display,
and coordinating the transferring of the spectra data to provide a given spectra data for each step of the Y axis thereby providing line by line display.

16. The method of display frequency spectrum data as claimed in claim 11 including the step of,
synchronizing the recirculation of the spectra data in the second memory unit to provide the display of portions of the spectra data in synchronization with the step voltage of the X axis signals.

* * * * *